United States Patent
Feren

[15] 3,651,945
[45] Mar. 28, 1972

[54] CONTINUOUS CULTURE SEPARATION APPARATUS

[72] Inventor: Conrad J. Feren, Indianapolis, Ind.
[73] Assignee: Eli Lilly and Company, Indianapolis, Ind.
[22] Filed: Mar. 16, 1970
[21] Appl. No.: 19,932

[52] U.S. Cl. ..................... 210/324, 210/297, 210/408, 210/325
[51] Int. Cl. ..................... B01d 23/00, B01d 21/02
[58] Field of Search ............... 210/367, 408, 483, 407, 409, 210/410, 411, 297, 325, 324, 295, 296, 515, 529, 518, 540

[56] References Cited

UNITED STATES PATENTS

| | | | |
|---|---|---|---|
| 779,346 | 1/1905 | Bendix | 210/408 |
| 781,107 | 1/1905 | Stewart | 210/325 |
| 2,538,575 | 1/1951 | Kracklauer | 210/324 |
| 3,107,217 | 10/1963 | Muller | 210/331 |
| 3,443,696 | 5/1969 | Schutte | 210/297 |
| 3,355,098 | 11/1967 | Farr | 210/540 X |

Primary Examiner—Frank W. Miga
Attorney—Trask, Jenkins & Hanley

[57] ABSTRACT

Apparatus for use in a continuous antibiotic production process to continuously withdraw from the culture broth a liquid portion from which growth organisms and solids are separated and left behind in the broth for further production. A separator rotor in the broth has an eccentrically located separation chamber communicating with the broth by way of a single restricted inlet/outlet opening through a peripheral surface of revolution. Such chamber connects at its inner end to an axial discharge passage in the rotor shaft, and a pressure difference is maintained to induce flow inward through the separation chamber to such discharge passage. The flow rate is slow to provide a long retention time in the separation chamber, during which solids are centrifugally separated and discharged through the restricted opening back to the broth. The chamber walls are so shaped that at any point a particle striking such surface on a radial path will be deflected and slide along such surface toward such opening, the "deflection" angle between the surface and the radius being sufficiently small to ensure such sliding. An angle of 45° has been found satisfactory, and angles less than 60° are considered useful.

17 Claims, 4 Drawing Figures

PATENTED MAR 28 1972　　3,651,945
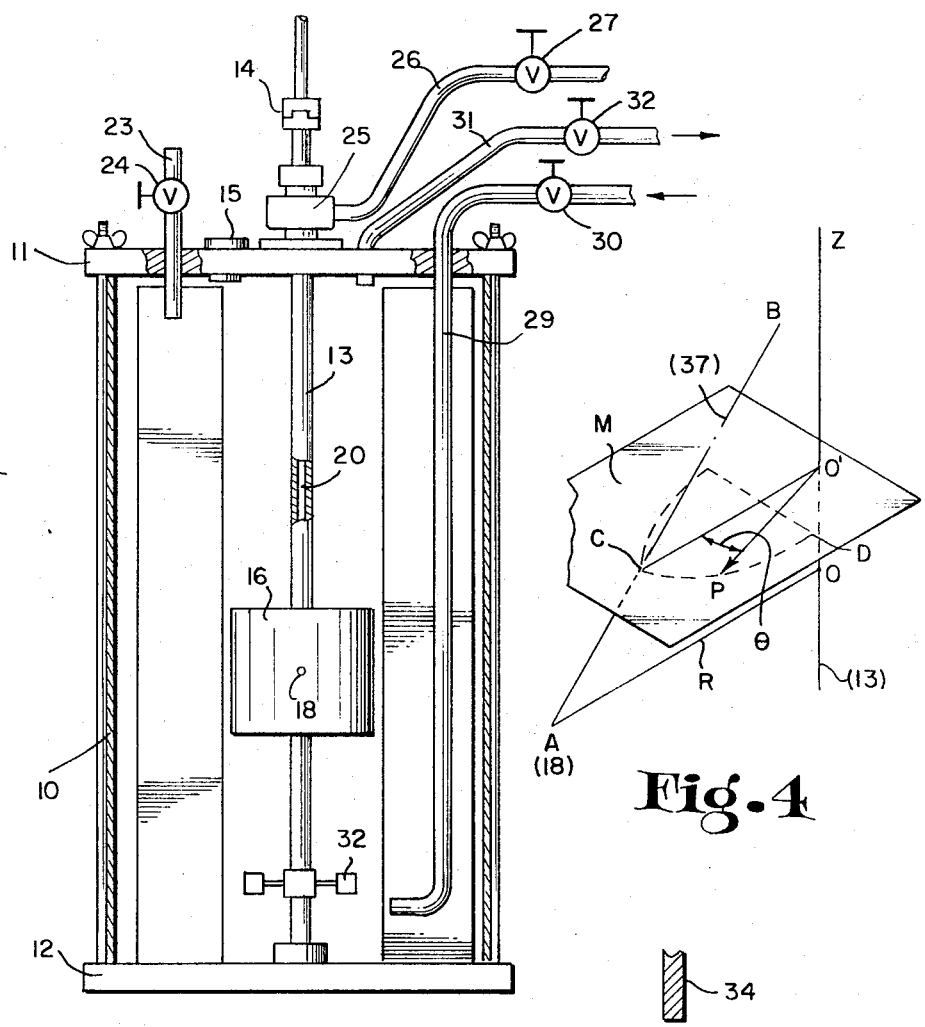
Fig.1
Fig.4
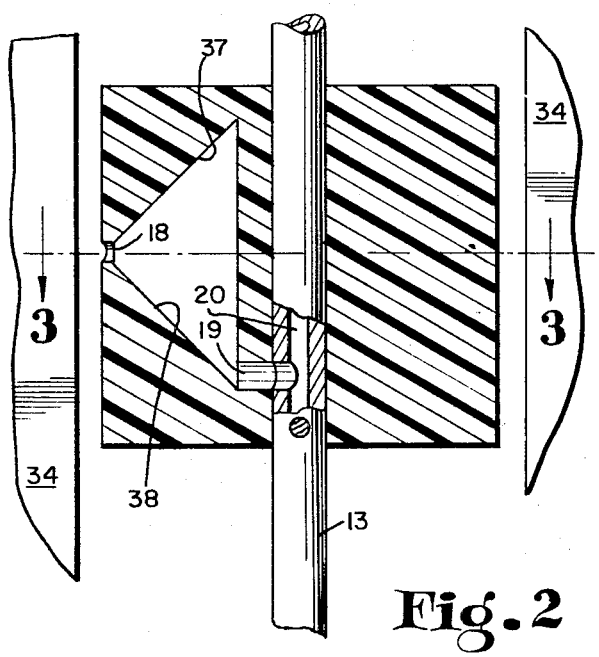
Fig.2
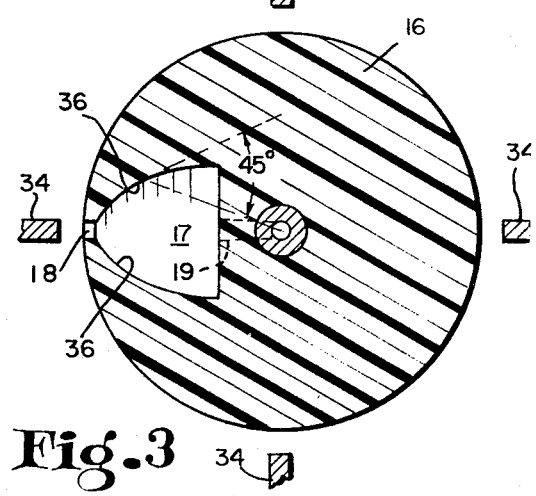
Fig.3
INVENTOR
CONRAD J. FEREN
BY
Trask, Jenkins & Hawley
ATTORNEYS

3,651,945

CONTINUOUS CULTURE SEPARATION APPARATUS

BACKGROUND OF THE INVENTION

Antibiotics are commonly produced commercially by culture of appropriate micro-organisms in a liquid culture broth in which favorable growth conditions are maintained, as by aeration and the addition of nutrient media. The process is a batch process which involves inoculation and a subsequent prolonged growth period until a useful concentration of the antibiotic is produced. The process is then terminated, the liquid phase containing the antibiotic is recovered, and the mature micro-organisms are discarded without further productions from them. Attempts have been made to produce antibiotics by a continuous process in which production would be maintained over extended periods from the same culture broth. But these have encountered difficulties, particularly in the step of removing from the culture broth the antibiotic produced while leaving behind the micro-organisms and other solids for further production. The present invention provides apparatus for effectively carrying out such removal.

SUMMARY OF THE INVENTION

The present invention provides a centrifugal separator which can be immersed in an antibiotic culture broth and operated to continuously withdraw a liquid portion of the broth while separating from such portion at least a substantial part of the growth organisms and other solids therein and returning such solids to the broth for further production. As such liquid portion is withdrawn, other liquid is added to maintain the broth, together with such nutrients and other broth constituents as may be necessary to maintain antibiotic production on a continuous basis.

The preferred form of apparatus comprises a closed vessel adapted to contain the culture broth and provided with such accessory equipment as is needed for maintaining growth conditions, including means for stirring and aerating the broth, means for adding nutrients, means for maintaining desirable volume and pressure, etc.

The continuous separator for separating antibiotic-containing liquid comprises a rotor which is immersed in the broth and desirably has the form of a solid of revolution. The rotor is formed with an interior eccentrically-located separating chamber having a rear or inner wall close to the axis of rotation. Side walls of the chamber extend outwardly from the rear wall and converge toward a single restricted opening through which the chamber communicates with the vessel below the liquid level therein. At its inner end the chamber has an outlet port communicating with a discharge passage extending upwardly through the shaft on which the rotor is mounted.

As the rotor rotates, a pressure difference is maintained to cause broth in the vessel to flow into and through the chamber and out the discharge passage. The flow rate is slow relative to the size of the chamber so that the broth will remain in the chamber for a long average retention time. Centrifugal force acting on the broth in the chamber urges solid particles radially outwardly, and the converging side walls guide the particles to the restricted opening, through which they return to the broth outside the rotor. The side walls of the chamber are so shaped that at any point on a wall, a particle urged thereagainst by centrifugal force will be deflected from a radial direction and will slide along such surface toward such opening. The angle between the wall surface and the direction of centrifugal force at each point is such that centrifugal force will have a force component along the surface sufficient to overcome friction between the particle and the surface and cause such sliding movement of the particle to the restricted opening. An angle of 45° has been found satisfactory, but other angles may be used between certain maximum and minimum limits, as hereinafter explained. Preferably, the angle is approximately uniform for all points in the side walls in order to avoid pockets which might cause obstruction to the desired movement.

DESCRIPTION OF THE DRAWING

FIG. 1 is a side elevation in partial section of apparatus embodying one form of the invention;

FIG. 2 is a fragmental view similar to FIG. 1, but on an enlarged scale;

FIG. 3 is a section on the line 3—3 of FIG. 2; and

FIG. 4 is an isometric diagram illustrating the manner in which one suitable form of separating chamber is determined.

DESCRIPTION OF THE PREFERRED EMBODIMENT

The apparatus illustrated in FIG. 1 comprises a vertical, cylindrical vessel 10 closed at top and bottom by upper and lower heads 11 and 12. Supported from the two heads is a rotatable vertical shaft 13 which extends through the upper head 11 and is adapted at its upper end for connection to a driving means, as through a drive coupling 14. Intermediate the height of the vessel 10 the shaft 12 carries a rotor 16 provided with an eccentrically-located separating chamber 17 communicating with the interior of the vessel through a single restricted inlet/outlet orifice 18 in the periphery of the rotor. At its inner extremity, the chamber 17 communicates through an outlet port 19 with a discharge passage 20 extending axially in the shaft 13. Such passage 20 opens above the top head 11 to a receiver 25 sealed about the shaft 13 and connected to a withdrawal pipe 26 having a control valve 27.

The head 11 is also provided with a liquid supply conduit 23 having a valve 24, and with an inoculation port 15 closed by a cap. An aeration pipe 29 having a valve 30 passes through the head 11 and leads to an air discharge end at the bottom of the vessel. An air removal pipe 31 opens from the top of the vessel and is controlled by a valve 32. Other connections as for control of temperature and the like may also be provided in accordance with conventional practice. To distribute air supplied by the conduit 29 throughout the broth, a rotating agitator 32 is provided near the bottom of the vessel. Such agitator may be fixed to the shaft 13 or may be independently driven by other means. Rotation of the entire body of the broth within the vessel is impeded by baffles 34.

The separation rotor 16 carried by the shaft 13 rotates with its periphery close to the inner edge of the baffles 34 so that it will not produce a vortex which would uncover the inlet/outlet opening 18 of such rotor.

Culture broth containing a suspension or solution of the necessary nutrients and other desired constituents is supplied to the vessel 10 in suitable amounts to submerge the rotor 16. Such broth is inoculated with the desired growth organism and growth conditions are maintained in known manner until a suitable concentration of the antibiotic or other growth product is produced.

When it is desired to remove product-containing liquid from the broth, the rotor 16 is rotated at a suitable speed and a pressure differential is established from the vessel to the withdrawal conduit 26 to cause flow at a controlled rate from the body of the broth into the inlet/outlet opening 18 of the rotor 16 and through the separation chamber 17, the port 19, the passage 20 and the receiver 25 to such conduit 26. The pressure differential may be provided either by suction on the conduit 26 or by regulating the control valves to produce an elevated pressure in the vessel 10.

The rate of flow through the separation chamber 17 is held to a value which retains the broth in the chamber for a prolonged retention time. This will vary with the nature of the broth and of the solids to be removed, and with the rate of rotation of the rotor 16 and the consequent centrifugal force applied to the broth in such separation chamber.

Centrifugal force resulting from rotation of the rotor 16 will act on the broth within chamber 17 and will urge the solids in the broth outwardly. Those walls of the chamber against which the solid particles are urged are so formed as to direct the particles toward the orifice 18, through which such particles will be returned to the body of the broth against the flow of normal broth forced inwardly through the chamber by the pressure differential.

I have found that the effectiveness of separation produced by the apparatus as so far described depends to a considerable extent on the angle between the surface of the chamber walls and the direction of the centrifugal force acting to impel particles against such surface. Where that angle is too great, the solid particles will not slide over the wall-surface to the orifice 18 but will adhere to the surface, remain in the chamber, and eventually clog the apparatus. On the other hand, the angle referred to cannot be reduced indefinitely without reducing the volume of the chamber, thereby reducing, for any given rate of broth flow, the average residence time of broth within the chamber and thus limiting the interval during which it is subjected to the separating action.

I find it desirable that the chamber walls be so shaped that at any point on a wall-surface the angle between the surface and the direction of centrifugal force at the point should be no more than about 60° and no less than about 20°. For convenience, this angle will hereinafter be referred to as the "deflecting angle." The deflecting angle used will depend on the nature of the broth and of the solids it contains, for example, whether the solids consist wholly of the micro-organisms or whether the broth also contains nutrients in solid form. For culture broths of the type used in producing antibiotics, I have found it satisfactory to use a deflecting angle of about 45°. A greater angle can be employed, but as angles of about 60° are approached, the danger of clogging is increased. Any advantage gained in promoting the passage of solid particles to the orifice 18 by reducing the angle much below 45° is partially or wholly offset by the consequent reduction in the volume of the separating chamber and in the residence time of the broth therein.

In the separating chamber, illustrated in the drawing, the deflecting angle is approximately equal at all points on the surfaces against which solid particles are urged by centrifugal force, and is approximately 45°. In any section perpendicular to the axis of the shaft 16, the chamber will have the general flatiron shape shown in FIG. 3 if, as is preferred, the radial depth of the chamber is less than the radius of the rotor and the inner wall of the chamber is plane, and parallel to the axis, as shown. The opposite side walls 36 (FIG. 3) of the chamber converge upwardly and downwardly from the horizontal median plane through the orifice 18 to meet each other along lines 37 and 38 (FIG. 2) which converge in the direction from the axis to the orifice 18.

A suitable form of chamber is one in which the side walls intersect any horizontal plane parallel to the aforesaid median plane in an arc of a logarithmic spiral having the polar equation $$r = \frac{R - dm}{e^{m\theta}}$$

in which $r$ is the radius from the rotor axis to the arc; $R$ is the distance between the rotor axis and an intersection point in the orifice 18; $d$ is the distance between the plane of the spiral and the median plane; $m$ is a constant approximating the cotangent of the deflecting angle; $e$ is the base of natural logarithms; and $\theta$ is the angle, in radians between the radius $r$ and the vertical plane through the rotor axis and the orifice. In the isometric diagram, FIG. 4, O–Z is vertical rotor axis; O–A is the radius to the orifice 18 and corresponds to R in the above equation; M is a horizontal plane intersecting the axis at O'; line A–B, which corresponds to line 37 of FIG. 2, is coplanar with O–A and O–Z and intersects plane M at C; and the arc C–D represents the intersection of the plane M with a side wall 36 of the chamber. Any point P on the arc C–D satisfies the above equation when R is made equal to O–A, $d$ to O—O', $\theta$ to the angle C–O'–P, and $m$ to the cotangent of angle O–A–B, which is also the angle between O'P and the tangent to arc C–D at P. FIGS. 2–4 presuppose for $m$ a value of unity, which is the cotangent of 45°.

In a separating chamber the side walls of which are formed by the application of the above equation, the actual deflecting angle at all points except those in the median plane will be somewhat smaller than that having the value $m$ for its cotangent, since the deflecting angle is toward the orifice 18, (the point A in FIG. 4) rather than an angle in the plane M. Nevertheless, the equation can serve to provide a practical definition of the general form of the chamber walls. In applying the equation to determine a preferred form for the chamber walls, $m$ is desirably given a value approximating unity, but values as low as about 0.5 approximating cot 60° or as high as about 2.6 approximating cot 22° may be used, always bearing in mind that lowering the value of $m$ increases the danger of clogging and increasing the value of $m$ reduces the volume of the chamber.

It will of course be understood that the chamber shape resulting from application of the above equation is not critical and can be considerably departed from while still retaining the advantages of the invention. Substantial advantage from the invention will be obtained so long as the size of the orifice 18 is small relative to the maximum chordal and axial dimensions of the chamber and the side walls of the chamber converge toward the orifice at inclinations such that the deflecting angle at all points is such that the separated solids will slide toward and out the inlet/outlet orifice 18.

The flow rate through the chamber should be sufficiently slow to provide a prolonged average retention time of material in the chamber, to thereby subject the material to centrifugal separation for a prolonged time. The desirable retention time will of course vary with the degree of separation desired, and those skilled in the art of micro-organism culture will recognize that it may be desirable to separate less than all the solids from the withdrawn liquid, so that a continuous withdrawal of some solids will occur to allow for replacement of solid nutrients and for growth of the micro-organism. Preferably, the average retention time is at least five minutes, and may be longer, up to 20 minutes or more. Such times may be obtained by regulating the flow to a rate of the order of one-fifth to one-twentieth of the volume of the chamber per minute.

As can be seen from the drawing, the eccentric separating chamber occupies only a minor portion of the total volume of the rotor, and it is therefore possible to provide the rotor with more than the single chamber illustrated. However, if that is done, the inner ends of the chambers should not communicate with each other in such a way that cross flow between them can occur. To this end, each chamber should have its own discharge passage 20 in the shaft 13, and these may be connected to separate receivers 25. If cross flow is possible, an inbalance of centrifugal force between chambers can produce undesirable flow in one chamber and out the other. This will prevent the desired separation and convey unseparated broth to the withdrawal passages.

It has been found desirable that the external surface of the rotor through which the orifice extends be a surface of revolution concentric with the shaft 16, preferably a cylindrical surface, and that the orifice 18 be substantially flush with that surface. Other arrangements tend to produce turbulence and promote rotation of the body of the broth, which is undesirable as it tends to increase the concentration of air in the broth admitted to the chamber.

As above mentioned, the baffles 34 oppose rotation of the whole body of the broth. They also appear to break up the flow pattern around the separator 16 and allow the air entrained in the flow to escape upward without entering the orifice 18 in undue amounts.

An apparatus constructed in accordance with FIGS. 1–3 had a rotor 2¾ inches in diameter and 2½ inches in length. The orifice 18 had a diameter of one-eighth inch, and the outlet port 19 a diameter of three-sixteenths inch. The chamber 17 had a volume of 10 ml. which would give a retention time of 10 minutes at a flow of 1 ml./min. Rotating at 1,750 r.p.m. in a bacterial broth which included solid nutrients, and with a flow-rate between 1 and 2 ml. per minute through the rotor, the device was capable of removing approximately 50 percent of the solids from the withdrawn broth. When used in a broth containing soluble nutrients, the device proved capable of removing about 90 percent of the solids.

I claim:

1. Apparatus for continuously withdrawing liquid from a liquid suspension and separating such withdrawn liquid from solids contained in the suspension, comprising a rotor adapted to be rotated on its axis in submerged position in the suspension, said rotor defining an interior, eccentrically-located separating chamber having a single outer restricted opening for inlet/outlet communication with the surrounding suspension, and an inner opening through which liquid may be withdrawn from the chamber, means to rotate said rotor on its axis to subject to centrifugal force the suspension contained in said eccentrically-located chamber and thereby cause the solids thereof to separate toward the outside of the chamber and liquid with reduced solids therein to separate toward the inside of said chamber for entry into said inner opening, means for causing a pressure differential across said chamber between said outer opening and said inner opening and thereby cause suspension to flow into said chamber through said inlet/outlet opening and such liquid to flow from said chamber through said withdrawal opening, the side walls of said chamber being shaped to converge outward of the rotor and toward said inlet/outlet opening to direct to such opening for outward passage therethrough solid particles urged against said walls by centrifugal force.

2. Apparatus according to claim 1 wherein the side walls of said chamber are so shaped that particles urged against any point thereon by centrifugal force are deflected from the direction of the centrifugal force toward such inlet/outlet opening at a deflection angle small enough to cause the particles to slide on said surface toward said opening.

3. Apparatus according to claim 2 wherein said deflection angle is of the order of 45°.

4. Apparatus according to claim 2 wherein the deflection angle is substantially uniform over the entire side walls of the chamber and is less than about 60°.

5. Apparatus according to claim 2 wherein the deflection angle does not exceed about 60° at any point on the walls of the chamber.

6. Apparatus according to claim 1 wherein the side walls are so shaped that at all points thereon the angle between the wall surface and the direction of centrifugal force urging a solid particle against it is sufficiently small that centrifugal force on the particle will have a component of force along the surface sufficient to overcome friction between the particle and the wall and cause the particle to slide toward said inlet/outlet opening.

7. Apparatus according to claim 6 wherein said angle does not exceed about 60° at any point on the chamber side walls.

8. Apparatus according to claim 6 wherein said angle is approximately uniform for all points on said side walls.

9. Apparatus according to claim 6 wherein said angle is between 60° and 20° for all points on said side walls.

10. Apparatus according to claim 8 wherein said angle is of the order of 45°.

11. Apparatus according to claim 1 wherein each side wall is substantially so shaped that any point in the wall will satisfy the polar equation $$r = \frac{R - dm}{e^{m\theta}}$$

in which $r=$ the radius from the point to the rotor-axis;
$R=$ the radius from the outer opening to the rotor-axis;
$d=$ the distance from the point to a plane through the outer opening perpendicular to the rotor axis;
$e=$ the base of natural logarithms
$\theta=$ the angle (in radians between the radius of the point and an axial plane through the outer opening; and
$m=$ has a value between 0.5 and 2.5.

12. Apparatus according to claim 11 in which the value of $m$ is approximately 1.

13. Apparatus according to claim 1 wherein the means for causing flow is arranged to cause a flow rate of the order of from one-fifth to one-twentieth the volume of the chamber per minute, whereby the average retention time of liquid in the chamber is of the order from 5 to 20 minutes.

14. Apparatus according to claim 1 wherein the means for causing flow is arranged to cause flow less than one-fifth the volume of the chamber per minute, whereby the average retention time of liquid in the chamber exceeds 5 minutes.

15. Apparatus for continuously withdrawing liquid from a solid-liquid suspension while centrifugally removing solid particles from the withdrawn liquid and returning them to the suspension, comprising a vessel for containing the suspension, a rotor mounted for rotation on its axis in the vessel, said rotor having an interior separating chamber located eccentrically with respect to said axis communicating through a single restricted outer opening with suspension in the vessel and through an inner opening with a withdrawal passage for liquid from which solid particles have been removed, means for causing flow into said chamber through said outer opening and from said chamber through said inner opening, said chamber having side walls which converge outwardly of the rotor to said outer opening to direct to said outer opening, for outward passage therethrough, solid particles urged against said walls by centrifugal force, and driving means for rotating said rotor on its axis to thereby subject the suspension in said chamber to centrifugal force and cause solids therein to separate outward against said converging sidewalls and slide therealong to said outer opening, and cause liquid having a reduced solids content to separate toward said inner opening for flow therethrough to said withdrawal passage.

16. Apparatus according to claim 15 wherein the means for causing flow is arranged to cause flow less than one-fifth the volume of the chamber per minute, whereby the average retention time of liquid in the chamber exceeds 5 minutes.

17. Apparatus according to claim 15 with the addition of at least one baffle in said vessel closely adjacent the surface of said rotor containing said outer opening, to break up the flow pattern produced in the vessel by the rotation of said rotor.

* * * * *